July 1, 1930.  F. A. WETTSTEIN  1,769,612
FLUID PRESSURE REGULATOR
Filed June 8, 1927  2 Sheets-Sheet 2

INVENTOR:
Fritz A. Wettstein

Patented July 1, 1930

1,769,612

UNITED STATES PATENT OFFICE

FRITZ A. WETTSTEIN, OF FLUSHING, NEW YORK

FLUID-PRESSURE REGULATOR

Application filed June 8, 1927. Serial No. 197,246.

This invention relates to automatic regulation, more particularly to automatic regulation of the fluid pressure type and still more particularly to automatic fluid pressure regulation provided with two relays arranged in series, of which the first relay may be termed a receiver and the second relay may be termed an amplifier.

Amongst the various objects of my invention are: to provide a practical, simple and highly efficient fluid pressure regulator in which the highest sensitiveness and accuracy of regulation are combined with a powerful regulating movement; to provide a fluid pressure regulator which is not affected in its function by changes in the temperature, viscosity and pressure of the actuating pressure fluid; to provide a regulator which is not affected in its accuracy by forces exercised on the regulating member, such as for example the force exercised by a pressure fluid on an unbalanced valve, forces of friction exercised on the regulating member, etc.; to provide a selfcontained fluid pressure regulating valve, i. e. a regulating valve actuated by the fluid which is to be regulated, which works equally satisfactorily for all ranges of pressures and of fluid flows; to provide a selfcontained fluid pressure regulator where particularly the regulated pressure is not affected by changes of other pressures; to provide a selfcontained fluid pressure regulator where the regulating mechanism composed of a receiver and an amplifier, is arranged outside of the main regulating valve and may be shut off from the fluid pressure so that it is readily accessible for repairs and cleaning; to provide a selfcontained fluid pressure regulator which closes automatically when the pressure fluid supply to the regulator proper is shut off, and which is equipped with means for hand operation so that it normally will not be necessary to provide a by-pass line to the regulator with stop valves in front and after the regulator and another stop and throttle valve in the by-pass line in order to take care of emergencies; to provide a selfcontained fluid pressure regulator containing a self cleaning strainer for keeping impurities contained in the pressure fluid away from the regulator proper; to provide an improved pressure relay or pressure receiver, comprising a selfcontained pressure diaphragm without springs and the deflection of which is well within the elastic limit so that undue friction and hysteresis are eliminated, further comprising means for the throttling of the pressure fluid flows of such designs that the possibility of clogging and sticking is reduced to a minimum, and further comprising means permitting for ready adjustment of the regulated pressure or other regulated condition.

Further objects, novel features and advantages of the invention will be apparent as the description proceeds which is presented with reference to the accompanying drawings of which.

In all of these embodiments the invention has by way of example been illustrated in combination with pressure regulators. It is to be understood however that the invention refers to any kind of regulation. In order to apply the invention to other problems of regulation it is merely necessary to replace the pressure diaphragms shown in the above examples by other means indicating the condition which is to be regulated, such as for example temperature, speed, humidity, voltage, concentration and other physical, chemical and electrical conditions. Further, instead of valves, other types of main control members may be used within the scope of this invention to control the condition which is to be regulated.

Figure 1:
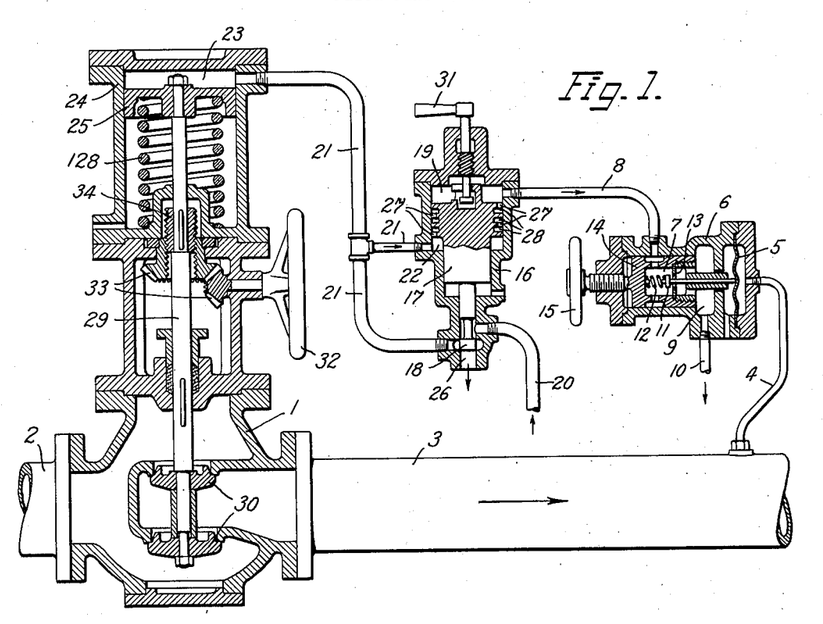
Fig. 1 is a sectional view of one embodiment of the invention as applied to a pressure reducing valve.

In Fig. 1, 1 designates a balanced valve which is supplied with a pressure fluid, such as for example steam or water, through pipe 2 and which maintains a constant or reduced pressure in the supply pipe 3. The reduced pressure in pipe 3 is transmitted through impulse conduit 4 to act on pressure diaphragm 5. Pressure diaphragm 5 is mounted in casing 6 which contains the first relay or the impulse receiver. The pressure fluid actuating the regulator, such as for example oil, is supplied to chamber 7 of the first relay or impulse receiver through conduit 8. From chamber 7, the exhaust of pressure fluid to the exhaust chamber 9 and return conduit 10 is controlled by a valve composed of a throttling member 11 held by spring 12 against pressure diaphragm 5 and controlling the opening in orifice plate 13. The orifice plate 13 is mounted inside slide 14 which is movably arranged in case 6 and the position of which may be adjusted by means of a screw and hand wheel 15. Casing 16 contains the second relay or amplifier comprising a differential piston 17 to which is connected a pilot valve 18. Chamber 19 above the differential piston 17 communicates by means of conduit 8 with chamber 7 of the impulse receiver. The pressure fluid used for the actuation of the regulator and servo motor is supplied through conduit 20. This pressure fluid supply is controlled by pilot valve 18 which may admit pressure fluid from conduit 20 to the conduit system 21 which is in communication with the intermediate chamber 22 of the differential piston 17 and with the servo motor chamber 23, formed by the servo motor cylinder 24 and the servo motor piston 25. From the conduit system 21, pressure fluid may be relieved by pilot valve 18 to the return port 26. Between chambers 22 and 19 of the differential piston 17, a connection is provided allowing for a restricted flow of pressure fluid from chamber 22 to chamber 19. In the modification shown in Fig. 1, this passage is in the form of four recesses 27 arranged between circumferential rilles 28 on differential piston 17. The recesses 27 are arranged alternatively on opposite sides of the piston 17. Servo motor piston 25, which is forced upward by spring 128, is mounted on the upper end of valve stem 29 which on its lower end carries the discs 30 of the balanced valve 1. Lever 31 permits hand operation of the pilot valve 18, while in the central position of lever 31, pilot valve 18 and differential piston 17 may move freely. By means of hand wheel 32, connecting gears 33 and screw drive 34, which is movable on valve stem 29 until it touches a collar on the same, the main valve 1 may be opened and operated by hand against the pressure of spring 128.

The mode of operation is as follows:

Assuming for example that the reduced pressure in pipe 3 decreases, this causes the deflection of diaphragm 5 to decrease, control of throttling member 11 moves slightly to the right, the flow of pressure fluid from chamber 7 to exhaust chamber 9 is throttled more, the pressure in chambers 7 and 19 increases, the differential piston 17 is forced downward, pilot valve 18 admits more pressure fluid from supply conduit 20 to the conduit system 21 and chambers 22 and 23, the increase of the fluid pressure in chamber 23 forces the servo motor piston 25 downward and the discs 30 in valve 1 open wider and admit more pressure fluid to the pipe 3. At the same time, the increase of the fluid pressure in chamber 22 counterbalances the increase of the pressure in chamber 19, so that the pilot valve 18 is returned to its neutral position and over regulation and hunting of the regulator system is prevented.

In a similar way, an increase of the reduced pressure in the pipe 3 results in a closing action of the regulating valve 1.

Equilibrium of the regulating system is only possible at the definite pressure for which the regulator is set. This will be clear from the following explanation. The differential piston 17 is in equilibrium only at a certain definite ratio between the pressures in chambers 19 and 22, which ratio is determined by the size of the opposed areas of the differential piston 17. The flow of pressure fluid from chamber 22 to chamber 19 is determined by the pressure difference between the two chambers and the size of the recesses 27 in the upper part of the differential piston 17. On the other hand, the flow of pressure fluid from chamber 19 to chamber 7 and from there through the orifice 13 to exhaust chamber 9 is determined by the pressure in chamber 19 and the relief opening provided by throttling member 11 and orifice 13. Since the pressure drop through orifice 13 is proportionate to the pressure drop through the recesses 27, and since the opening provided by recesses 27 remains unchanged, it follows that the opening provided by orifice 13 and throttling member 11 must always be the same for a condition of equilibrium. This means, that for a condition of equilibrium of the regulator, the position of the throttling member 11 must always be the same which is only the case for a definite regulated pressure in pipe 3. This pressure may readily be adjusted by changing the distance between orifice 13 and diaphragm 5. In the modification shown in Fig. 1 this may be done by adjusting the position of slide 14 by means of a screw drive and hand wheel 15. By moving slide 14 with orifice 13 to the right, the system regulates for a lower pressure and by moving slide 14 to the left the system regulates for a higher pressure in pipe 3.

Since it is one of the most important advantages of the invention to provide for increased sensitiveness, accuracy and power of regulation, the principal factors contributing to this result are herewith explained with reference to the modification shown in Fig. 1, but these explanations also apply to the systems shown in Figs. 2, 3 and 4, which are only different modifications of the same invention.

As explained above, a decrease for example of the regulated pressure in pipe 3 causes an increase of the fluid pressure in chambers 7 and 19, and this increase in turn causes a corresponding increase of the fluid pressure in chambers 22 and 23. This increase is proportionate to the increase of pressure in chamber 19 and since a small change of the regulated pressure in pipe 3 results in a comparatively small change of the pressure in chamber 19, and in a corresponding comparatively small change of the fluid pressure in chamber 23, this increase of the pressure in chamber 23 may not be able to overcome the friction of the servo motor piston 25, stuffing boxes in valve 1, etc. Different means have hitherto been used to overcome this disadvantage and to cause a large pressure differential in chamber 23 for a small pressure differential in the reduced pressure in pipe 3. One of these means consists in the introduction of a lever between the pressure diaphragm 5 and the throttling member 11 so as to multiply the deflection of the diaphragm 5. However, this introduces an undesirable complication causing friction, and due to the high ratio of transmission between the diaphragm 5 and the throttling member 11, the actuating power at the throttling member 11 is reduced in the same ratio as its movement is increased. Such throttling members have therefore been subject to sticking due to the smallest amount of friction or of clogging. Another means to increase the sensitiveness of the regulator consists in increasing the ratio of the piston areas at the differential piston 17. However, an investigation of the throttling of a pressure fluid at two subsequent places shows that the best results are obtained if the regulated pressure is equal to 0.5 to 0.8 of the initial pressure. The ratio of the piston areas on the differential piston 17 should therefore preferably be within the same limits. In accordance with the invention, sensitiveness is instead obtained in the following way. Since differential piston 17 and pilot valve 18 are entirely free to move, a very small change of the fluid pressure in chamber 19 is able to overcome the small amount of friction and to move the differential piston 17 with pilot valve 18. An increase for example of the pressure in chamber 19 causes a proportionate increase of the pressure in chambers 22 and 23. This increase may not be sufficient to move servo motor piston 25. However, due to this increase, the flow of pressure fluid through recesses 27 is increased, and since throttling member 11 is still closed somewhat more than corresponds to the condition of equilibrium, a further increase of the fluid pressure in chamber 19 results. This increase in turn moves differential piston 17 downward, pilot valve 18 opens again and the pressure in chamber 22 is increased further. This in turn causes again an increase of the flow of pressure fluid to chamber 19, resulting in an additional change of the pressure in chamber 19. This play is repeated and the pressures in chambers 19 and 22 increase proportionately until the pressure in chambers 22 and 23 is sufficiently large to overcome the resistance of servo motor piston 25 and to actuate the regulating valve 1. As soon as the valve 1 has regulated sufficiently to reestablish the reduced pressure in pipe 3 for which the regulator is set, equilibrium is again obtained. In this way, a very small pressure differential in the regulated pressure in pipe 3 may result in a large pressure differential in the servo motor chamber 23 so that a powerful and positive regulating movement is obtained.

The sensitiveness of the regulator is further increased by the special design of the impulse receiver, which eliminates the possibility of undue friction. It has been found that pressure diaphragms loaded by springs show a considerable amount of hysteresis which is very detrimental to accurate regulation. It is therefore proposed to use a self-contained, preferably corrugated diaphragm 5, so designed that its deflections are well within the elastic limit of the material. Since the small throttling member 11 moves practically without friction, a very minute pressure differential in the regulated pressure in pipe 3 is transformed accurately into a corresponding pressure differential in chamber 19. A small pressure differential in chamber 19, multiplied by the piston area of the differential piston 17, provides sufficient power to move the differential piston 17. As soon as the differential piston 17 is moved, the above described additive interplay between the pressures in chambers 19 and 22 takes place. Due to this additive effect between the two pressures, the sensitiveness and accuracy of the regulator are determined by the characteristics of the receiver and amplifier only and are not affected by friction and other forces exercised on the servo motor and on the regulating valve. The throttling member 11 need only be moved by pressure diaphragm 5 so much that the resulting pressure differential in chamber 19 overcomes the small amount of friction at the differential piston 17. Thereupon, the above described additive interplay between the pressures in chambers 19 and 22 takes place until the desired regulating movement of the main regulating valve 1 is obtained.

From the above it is further evident that, neglecting the weight of the piston, the regulator has no permanent pressure variation, but that the regulated pressure is always exactly the same during periods of equilibrium, with only slight deviations when regulation takes place. If no permanent pressure variation is desired, the piston can in practice be made sufficiently light so that substantially this result is obtained, while if a permanent pressure variation is desired it can be obtained by using a heavy or a loaded piston, as it will be obvious that a weight factor in the piston will introduce a permanent variation factor in the regulator, and that the amount of permanent variation will vary with variations in the weight factor of the piston.

In addition, changes of the fluid pressure in the supply conduit 20 have no effect on the exact value of the regulated pressure in pipe 3, due to the fact that the pressure fluid supply to the impulse receiver is not taken directly from the supply pressure in conduit 20 as has been customary in some known designs, but from the servo motor pressure in chambers 22 and 23. In some known regulator designs, forces exercised on the main regulating valve, such as for example an out of balance force exercised by the pressure fluid on the valve discs 30, or friction in stuffing box and servo motor, affect the regulated pressure. This disadvantage is overcome by the present invention. Forces exercised on the main control member or the servo motor merely result in a change of the pressure in chamber 23 and in a corresponding change of pressure in the chamber 19, whereas the position of the throttling member 11 and therefore the value of the regulated pressure in pipe 3 remain unchanged. In a similar way, changes in temperature and viscosity of the actuating pressure fluid do not affect the regulated pressure in pipe 3 due to the fact that for a condition of equilibrium, the throttling member 11 must always be in the same position.

The emergency shut off arrangement 31 permits the instant closing or opening of the main regulating valve 1 at will. By moving differential piston 17 together with pilot valve 18 downward, the regulating valve 1 is opened wide. By moving pilot valve 18 upward, the fluid pressure in chamber 23 is relieved and spring 128 closes regulating valve 1 instantly. The regulating valve 1 may then be operated by hand by means of the hand wheel 32, actuating gears 33 and screw drive 34.

Figure 2:
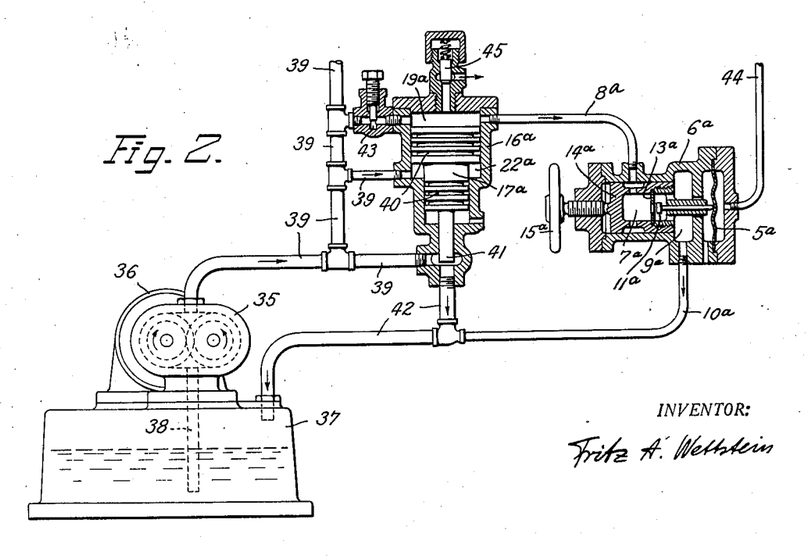
Fig. 2 is a sectional view of a modified form of the regulator proper as it may be applied to an over flow or excess pressure valve.

In Fig. 2, 35 designates a gear pump driven by an electric motor 36 running at approximately constant speed such as is the case for example with an induction motor. 37 is a reservoir partly filled with pressure fluid used for the actuation of the regulator. A practically constant amount of pressure fluid is taken by gear pump 35 from reservoir 36 through conduit 38 and supplied to the conduit system 39. 16$^a$ designates a casing containing the amplifier, and 17$^a$ is again a differential piston provided with rilles 40 for reducing the amount of leakage past the pistons. The lower part of the differential piston 17$^a$ forms a relief valve 41, balanced with respect to fluid pressure from conduit 39, which controls the relief of pressure fluid from conduit system 39 to the return conduit 42, from where the pressure fluid flows back to the reservoir 37. The pressure in conduit system 39 communicates with the intermediate chamber 22$^a$ of the differential piston 17$^a$. A restricted amount of pressure fluid is passed from the conduit system 39 through the adjustable throttle port 43 to the chamber 19$^a$ above the differential piston 17$^a$, which communicates by means of conduit 8$^a$ with chamber 7$^a$ in the casing 6$^a$ containing the impulse receiver. As in Fig. 1, 5$^a$ designates a pressure diaphragm, 9$^a$ an exhaust chamber from where the pressure fluid flows through conduits 10$^a$ and 42 back to the reservoir 37, 11$^a$ is a throttling member held by the pressure in chamber 7$^a$ against the diaphragm 5$^a$ and controlling the relief of pressure fluid through orifice 13$^a$, 14$^a$ designates again a slide holding orifice plate 13$^a$, and adjustable by means of hand wheel 15$^a$ and connecting screw drive. The impulse conduit 44 is supposed to transmit the regulated pressure ahead of a regulating valve, for example in pipe 2 of Fig. 1, to the pressure diaphragm 5$^a$. Conduit system 39 is supposed to be connected with the pressure chamber of a servo motor, for example with chamber 23 of the regulating valve 1 shown in Fig. 1. 45 designates a small adjustable relief valve on casing 16$^a$ adapted to relieve pressure fluid from chamber 19$^a$ if the pressure in this chamber increases above a predetermined value.

The mode of operation is as follows:
If for example the pressure ahead of the main regulating valve increases, this increase is transmitted through conduit 44 to the pressure diaphragm 5$^a$, causing a deflection of the diaphragm toward the left. Throttling member 11$^a$ is also moved toward the left, throttling the flow of pressure fluid through orifice 13$^a$. The pressure in chamber 7$^a$, conduit 8$^a$ and chamber 19$^a$ is increased, differential piston 17$^a$ moves downward, relief valve 41 throttles the flow of pressure fluid from conduit system 39 to the return conduits 42, and the pressure in conduit system 39 increases and causes an opening movement of the main regulating valve. The governor as described acts therefore as an overflow or excess pressure governor, maintaining a constant pressure ahead of the regulating valve and relieving any excess of pressure fluid to the low pressure side of the valve.

In a similar way as described for the modification shown in Fig. 1, the increase of the pressure in conduit system 39 and chamber 22$^a$ checks the movement of differential piston 17$^a$, counterbalancing the pressure in chamber 19$^a$ and preventing over travel of the relief valve 41. Further, the same additive interplay between the pressures in chambers 19ª and 22ª takes place as described above for the modification shown in Fig. 1, so that a very minute pressure differential in the impulse conduit 44 may cause a large pressure differential in the conduit system 39 and in the servo motor chamber of the main regulating valve.

If the main regulating valve is completely open and the pressure ahead of the valve increases further, the actuating fluid pressures in chambers 19ª and 22ª would evidently increase indefinitely. To prevent this emergency, the relief valve 45 is provided which is set for a pressure in chamber 19ª slightly above that corresponding to wide open regulating valve.

The fluid pressure pump 35 evidently works against the fluctuating servo motor pressure in conduit system 39. If the main regulating valve is closed and the regulated pressure ahead of the valve is below normal, the relief valve 41 is wide open and the pump 35 delivers against a very low pressure. On the other hand, if the main regulating valve opens, the pump 35 has to deliver against an increasing pressure in the conduit system 39 in order that this pressure may balance the closing power of the spring on the servo motor. Contrary to this, in the embodiment of the invention as shown in Fig. 1, the pump has to deliver against a pressure in conduit 20 which is always higher than the maximum pressure required in the servo motor chamber 23. The embodiment shown in Fig. 2 offers therefore the advantage that less power is required for the operation of the regulator and further that the actuating pressure fluid is heated less. The action of the pilot valve 18 in the embodiment shown in Fig. 1 is accomplished in the embodiment shown in Fig. 2 by the relief valve 41 in combination with pump 35 supplying a practically constant amount of actuating pressure fluid. Variations in the supply of pressure fluid by pump 35 do not affect regulation as long as they are within reasonable limits, as is the case for example if the pump 35 is driven by an induction motor 36. It is evident that the modification shown in Fig. 2 constitutes a unitary system of automatic control, driven by an electromotor running at constant speed and producing a variable fluid pressure for the powerful and accurate actuation of a spring loaded servo motor. Regulator and servo motor may be shut down instantly by shutting down the electric motor which relieves the actuating fluid pressure.

Figure 3:
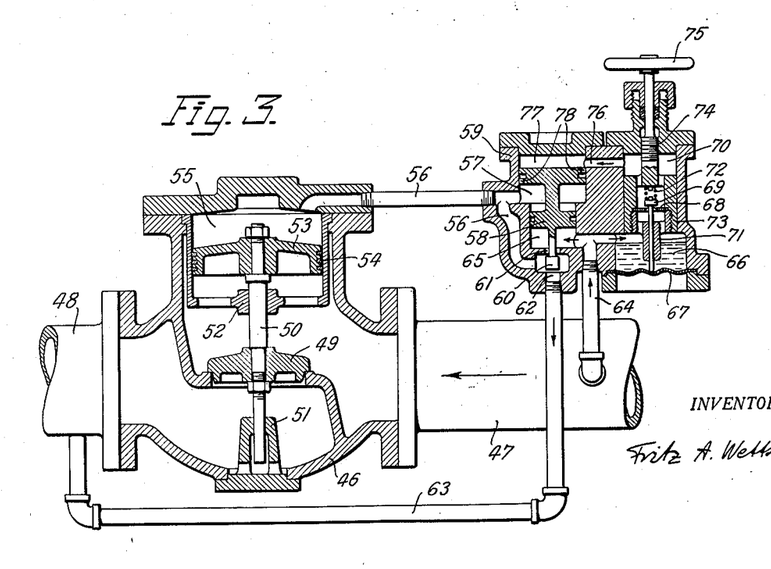
Fig. 3 is a sectional view of the invention as applied to a selfcontained fluid pressure regulating valve of the over flow or excess pressure type.

In Fig. 3, 46 designates a selfcontained single seated pressure regulating valve of the over flow or excess pressure type, the pressure fluid such as for example steam or water, entering from the right through pipe 47 and leaving through pipe 48 at the left. The valve disc 49 is mounted on valve stem 50 which is guided at 51 and 52, and which carries at its upper end the servo motor piston 53 provided with piston rings 54. The servo motor chamber 55 above the servo motor piston 53 communicates through conduit 56 with the intermediate chamber 57 of the differential piston 58 arranged in casing 59, which contains both impulse receiver and amplifier. To the differential piston 58 is connected the throttling member 60 which is in the form of a pilot valve, but which does not cover simultaneously both inlet port 61 and outlet port 62. The chamber between ports 61 and 62, through conduits 56 is in communication with chambers 55 and 57. The outlet port 62 communicates through conduit 63 with the outlet side 48 of the main valve 46. Conduit 64 connects the inlet side 47 of the main valve 46 with chamber 65 below differential piston 58 and with the chamber 66 in which the pressure acts on the diaphragm 67. From chamber 66 a restricted amount of pressure fluid is admitted through orifice 68, which is controlled by throttling member 69, to chamber 70. Throttling member 69 is loosely held in guide 71 and forced against diaphragm 67 by spring 72. The orifice plate 68 is mounted inside slide 73, the position of which may be adjusted by means of screw 74 and hand wheel 75. Chamber 70 communicates through conduit 76 with chamber 77 above the differential piston 58. A restricted passage is provided between chambers 77 and 57 by two recesses 78 provided on opposite sides of the differential piston 58, and by an annular rille connecting the two recesses.

The mode of operation is as follows:

Upon an increase of the regulated pressure in pipe 47 for example, the center of diaphragm 67 together with throttling member 68 moves downward, the flow of pressure fluid from chamber 66 to chamber 70 is reduced, the pressure in chamber 70 and connecting chamber 77 decreases, the differential piston 58 moves upward, the throttling member 60 throttles the flow of pressure fluid through inlet port 61 and increases the flow of pressure fluid through outlet port 62, the pressure in chambers 57 and 55 decreases, over travel of the differential piston 58 is checked, and the servo motor piston 53 together with valve disc 49 is moved upward so that the regulating valve 46 is opened wider and the excess of pressure in pipe 47 is relieved. The overtravel of piston 58 is checked by reason of the fact that the pressures in chambers 57 and 77 exert forces in opposite directions on the piston and increase or decrease as the case may be together. Thus an increase in pressure in chamber 77, causing a downward movement of piston 58, results in an increase in chamber 57 counterbalancing the increase of pressure in chamber 77 and preventing overtravel of the piston. Obviously the converse is true when a decrease in pressure 77 causing piston 58 to rise results in a corresponding decrease in pressure in chamber 57. As soon as sufficient pressure fluid from pipe 47 is relieved and the pressure for which the regulator is set is again established, the throttling member 69 is again in its normal position corresponding to equilibrium of the regulator. If the first change of the fluid pressure in servo motor chamber 55 is not able to overcome the friction in the regulating valve 46 and to move the servo motor piston 53, the same additive interplay between the fluid pressures in chambers 77 and 57 takes place as explained with regard to the modifications shown in Figs. 1 and 2, until the pressure differential in servo motor chamber 55 becomes sufficiently large to overcome the friction. The sensitiveness also of this regulating valve is therefore only determined by the regulator proper consisting of receiver and amplifier. In the impulse receiver, friction is practically eliminated due to the truly elastic and self contained pressure diaphragm 67 and also due to the fact that the small throttling member 68 moves freely in guide 71 which is surrounded by a uniform pressure so that there is no flow of pressure fluid along the inside of guide 71 which would tend to clog this guide. In the event that the regulated pressure fluid is steam, condensate is formed in chamber 66 which partly fills this chamber and protects diaphragm 67 from contact with the high steam temperatures. The differential piston 58 of the amplifier is entirely free to move upon a slight change of the pressure in chamber 77. In order to reduce further the possibility of clogging and sticking, a throttling member 60 is provided instead of an ordinary pilot valve. Throttling member 60 does not cover simultaneously ports 61 and 62 so that there is a continuous flow of pressure fluid from chamber 65 to conduits 63 and 56, and so that there is no friction whatsoever at this point. It is therefore evident that a very minute differential in the regulated pressure in pipe 47 is able to actuate the receiver and the amplifier and to cause a large pressure differential in the servo motor chamber 55 so that great sensitiveness, accuracy and power of regulation are obtained.

The servo motor piston 53 is preferably of such size that its area is equal to double the area of the valve opening controlled by valve disc 49. For a condition of equilibrium, the pressure in the servo motor chamber 55 is then equal to the arithmetical mean between the initial or regulated pressure in pipe 47 and the secondary pressure in the pipe 48. This has the advantage that during periods of regulation, the pressure in the servo motor chamber 55 may deviate above and below its mean value by a maximum and equal amount, corresponding to half of the difference between the initial pressure in pipe 47 and secondary pressure in pipe 48. In a similar way, it is preferred to provide a ratio of approximately 1 to 2 for the piston areas of the differential piston 58. The relay pressure in chamber 77 is then evidently equal to the arithmetical mean between the initial pressure in pipe 47 and the servo-motor pressure in chamber 57. The pressure ratios as described above are evidently maintained regardless of variations in the secondary pressure in pipe 48, so that wide variations in the secondary pressure in pipe 48 do not affect the regulated pressure in pipe 47. For the same reason, regulator and valve work equally well for all ranges of initial and secondary pressures and for all ranges of fluid flows through the regulating valve 46.

Figure 4:
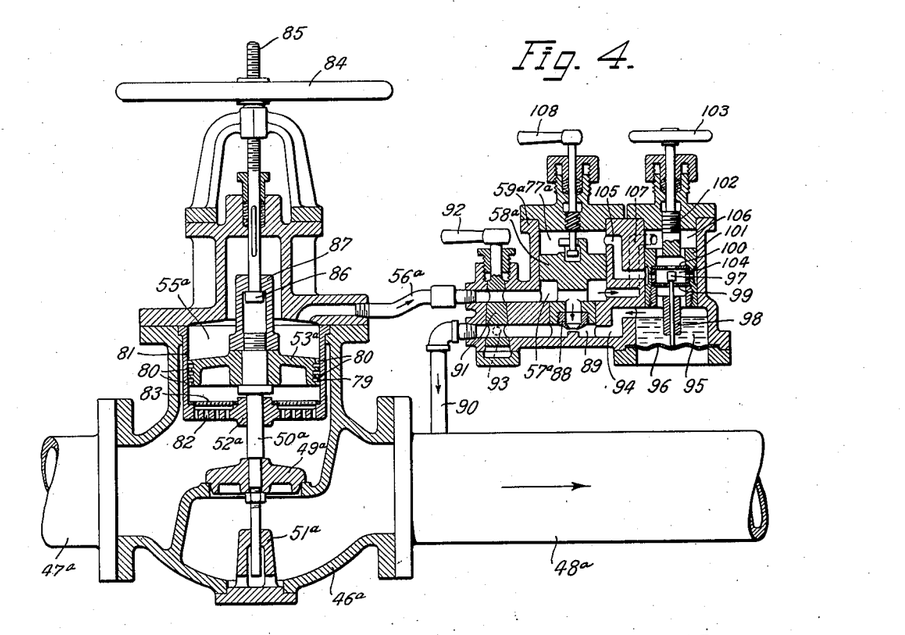
Fig. 4 is a sectional view of a similar form of the invention as applied to a selfcontained fluid pressure reducing valve.

In Fig. 4, 46$^a$ designates a self contained single seated pressure regulating valve of the reducing pressure type, the fluid entering from the left through pipe 47$^a$ and leaving through pipe 48$^a$ at the right. The valve disc 49$^a$ is mounted on valve stem 50$^a$ which is guided at 51$^a$ and 52$^a$ and carries at its upper end the servo motor piston 53$^a$ provided with annular rilles 79. Between these annular rilles and the two sides of the servo motor piston are provided recesses 80 which are arranged alternatively on opposite sides of the servo motor piston 53$^a$. 81 is the servo motor cylinder, the lower part of which is provided with perforations 82 forming a wide mesh strainer. Inside the servo motor cylinder 81 is arranged a finer strainer 83. The regulating valve may be operated by hand by means of hand wheel 84, actuating the rising stem 85 which carries collar 86 adapted to move within a cylinder 87 and to actuate the servo motor piston 53$^a$ and valve disc 49$^a$ when moved beyond the end positions in cylinder 87. The servo motor chamber 55$^a$ above servo motor piston 53$^a$ communicates through conduit 56$^a$ with the intermediate chamber 57$^a$ of the differential piston 58$^a$ which is arranged in casing 59$^a$. The lower part of differential piston 58$^a$ carries nozzle 88 through which communication is established between the intermediate chamber 57$^a$ and chamber 89 below differential piston 58$^a$. Chamber 89 is in communication through conduit 90 with the reduced pressure in pipe 48$^a$. 91 is a double plug valve which may be actuated by lever 92 and which is adapted to shut off conduits 56 and 90 upon a quarter turn of the lever 92. At the same time, communication is established through opening 93 between the chamber 89 and the atmosphere so that upon a quarter turn of lever 92 the regulator proper consisting of receiver and amplifier is shut off from all fluid pressure supply and from the regulating valve proper and so that the remaining pressure fluid in the regulator proper is relieved to the atmosphere. Conduit 94 connects chamber 89 with chamber 95 where the regulated pressure acts on diaphragm 96. 97 is a throttling member, loosely held in guide 98 and resting against diaphragm 96. Throttling member 97 is adapted to control the openings in the two orifice plates 99 and 100. The guide 98 and orifice plates 99 and 100 are mounted inside slide 101 which is adjustable in casing 59ª by means of screw 102 and hand wheel 103. Chamber 104 between the orifice plates 99 and 100 communicates through conduit 105 with chamber 77ª above differential piston 58ª. Chamber 106 above orifice plate 100 communicates through conduit 107 with the intermediate chamber 57ª of the differential piston 58ª. The differential piston 58ª may be actuated by hand by means of lever 108 and connecting screw drive. This arrangement is provided in such a way that the differential piston 58ª is free to move when the stop arrangement 108 is in its center position.

The mode of operation is as follows:

Upon a decrease for example of the regulated or reduced pressure in pipe 48ª, the pressure diaphragm 96 moves throttling member 97 slightly upward, the opening at orifice plate 99 is increased and the opening at orifice plate 100 is decreased, the pressure in chamber 104 and in communicating chamber 77ª decreases, the differential piston 58ª moves upward, nozzle 88 opens wider and the pressure in the intermediate chamber 57ª and the communicating servo motor chamber 55ª decreases, the initial pressure in pipe 47ª forces servo motor piston 53ª upward so that valve disc 49ª opens wider and admits more pressure fluid to pipe 48ª until the normal reduced pressure is again established. In a similar way as described with reference to the other modification of the invention, an additive interplay occurs between the pressures in chambers 77ª and 57ª at the differential piston 58ª so that a small change of the regulated pressure in pipe 48ª may result in a large change of the relay pressure in chamber 77ª and of the servo motor pressure in chamber 55ª so that accurate regulation and a powerful regulating movement are obtained.

The ratio of the areas of the servo motor piston 53ª and of the main valve disc 49ª on the one hand and of the two pistons composing the differential piston 58ª on the other hand, are preferably provided similar as explained with reference to the modification shown in Fig. 3. As explained above, the regulator will therefore work equally well over the entire pressure range and flow range, and changes of the initial pressure in pipe 47ª do not affect the exact value of the regulated pressure in pipe 48ª.

The possibility of clogging and sticking of the various parts of the regulator due to impurities contained in the pressure fluid is reduced to a minimum due to the fact that all pressure fluid coming in contact with any of the moving parts of the regulator, must pass through the strainer 83, where undue impurities are held back. During operation of the regulator, there is a continuous flow of pressure fluid from pipe 47ª through strainer 83 and through the restricted openings 80 to the regulator proper consisting of receiver and amplifier. This auxiliary flow of pressure fluid is small compared with the flow capacity of the main valve 46ª. If therefore servo motor piston 53ª moves downward even at a moderate speed, it displaces more steam in the servo motor cylinder 81 than may escape through the restricted openings 80. The flow of pressure fluid through the strainer 83 is therefore reversed at such occasions and the pressure fluid flow through the strainer 83, which is then directed downward, carries away the impurities which previously have assembled at the lower side of the strainer 83. The strainer 83 is therefore to a large extent self cleaning. The possibilities of clogging and sticking are further reduced due to the special design of the various throttle ports. By providing a number of recesses 80 at the circumference of the servo motor piston 53ª, one side of these passages is formed by the piston and the other side by the cylinder, so that the two sides move continuously against each other resulting in a tendency to remove impurities which might otherwise stick in an ordinary passage without moving sides. Further, by arranging a number of throttle passages or recesses 80 in series, the width of each passage may be much larger for the same flow of pressure fluid than if only one throttle passage were provided. By arranging the recesses 80 alternatively on opposite sides of the piston 53ª or in some other symmetrical arrangement, the action of the fluid pressure in the recesses 80 on the piston 53ª is balanced so that binding of the piston 53 is prevented. The possibility of clogging of orifice 88 and at the orifice plates 99 and 100 is reduced by providing sharp edges causing a sudden contraction of the flow of pressure fluid and reducing the length of the narrow passage where clogging is most likely to take place to a minimum.

The regulated pressure in pipe 48ª may be adjusted by means of hand wheel 103. By moving slide 101 downward, the reduced pressure is increased and by moving slide 101 upward, the system regulates for a higher reduced pressure in pipe 48ª.

By means of lever 108 and connecting screw drive, the differential piston 58ª may be actuated by hand. If the differential piston 58 is forced downward so that nozzle 88 is closed, the pressure in the servo motor chamber 55ª builds up until it is equal to the initial pressure in pipe 47ª so that the disc 49ª is pressed down upon its seat with great force, ensuring perfect tightness of the main valve. If on the other hand the differential piston 58ª is forced upward, the pressure in servo motor chamber 55ª decreases until it is equal to the reduced pressure in pipe 48ª so that the main valve 46ª is opened wide.

The double plug valve 91 serves to isolate the regulator proper consisting of receiver and amplifier from the regulating valve proper and from any supply of pressure fluid. By a quarter turn of the lever 92, the two conduits 56ª and 90 are shut off and at the same time, connection is made through outlet 93 between the chamber 89 and the atmosphere so that all fluid pressure in the regulator proper is relieved, whereupon the regulator proper is accessible for inspection and cleaning. As soon as the plug valve 91 is closed, the pressure in servo motor chamber 55ª builds up and the main valve 46ª is closed. It may then be opened and operated by hand by means of the hand wheel 84 actuating the rising stem 85 which by means of collar 86 fitting against the upper part of the cylinder 87 lifts servo motor piston 53ª together with valve disc 49ª against the pressure in chamber 55ª. Thus, the flow of pressure fluid through the main valve 46 need not be interrupted while the regulator proper is opened for inspection or cleaning. The expensive and cumbersome arrangement of a by-pass line to the regulating valve 46ª, including a stop valve ahead and after the regulating valve 46ª and another stop and throttle valve in the said by-pass line, an arrangement frequently used with regulating valves, is therefore not necessary with regulating valves built in accordance with this invention.

From the description of the various embodiments of the invention it will be clear to those skilled in the art, that the basic principles of the invention which are sought to be protected may be applied in many different ways. One of the main features of the invention consists in that two fluid pressures are created which are controlled by a sensitive receiver and an amplifier in such a way that a delicate regulating impulse causes a substantial change in the said two pressures due to an additive interplay between the two pressures. The two pressures are obtained by controlling two flows of a pressure fluid, a smaller flow controlled in the receiver by the delicate regulating impulse, and a larger flow controlled in the amplifier by the fluid pressure created by controlling the said smaller flow of pressure fluid. The additive interplay between the two fluid pressures is thereby obtained by interconnecting the two flows of pressure fluid, either by branching the smaller flow out from the larger flow at the pressure which is created by controlling the larger flow, or by leading the smaller flow into the larger flow at the same pressure. It thereby does not matter how the control of the two pressure fluid flows is accomplished. This may be done for example, as shown in the different embodiments of the invention, by means of a constant throttling followed by a variable throttling, by two subsequent and variable throttlings of a pressure fluid flow, by means of a pilot valve, or by means of a constant supply pressure fluid motor in combination with a variable throttling.

Having thus described my invention, what I claim is:

1. The method of operating a fluid pressure regulator which comprises creating a change in a first fluid pressure by an effect due to variation in that which is to be regulated, creating a change in a second fluid pressure by an effect due to the change in the said first fluid pressure, and creating further additive changes in the said first fluid pressure by an effect due to the changes in the said second fluid pressure.

2. The method of operating a fluid pressure regulator which comprises defining the magnitude of a first fluid pressure by controlling a first flow of pressure fluid by an effect due to that which is to be regulated, defining the magnitude of a second fluid pressure by controlling a second flow of pressure fluid through changes in the magnitude of the said first fluid pressure, and causing an additive change in the said first fluid pressure by changing the said first flow of pressure fluid by means of changes in the said second fluid pressure.

3. The method of operating a fluid pressure regulator which comprises defining the magnitude of a first fluid pressure by controlling a first flow of pressure fluid by an effect due to that which is to be regulated, defining the magnitude of a second fluid pressure by controlling a second flow of pressure fluid through changes in the magnitude of the said first fluid pressure, establishing an intercommunication between the said two fluid pressures by means of the said first flow of pressure fluid so as to obtain an additive effect between the said two fluid pressures, and causing a regulating movement by an effect due to changes in the said second fluid pressure.

4. The method of operating a fluid pressure regulator which comprises defining the magnitude of a first fluid pressure by means of an effect resulting from that which is to be regulated, defining the magnitude of a second fluid pressure through changes in the magnitude of the said first fluid pressure, establishing a balance between the said two fluid pressures so as to obtain a definite relation between the said two fluid pressures, establishing a pressure fluid intercommunication between the said two fluid pressures so as to obtain an additive effect between the said two fluid pressures upon a change of the said first fluid pressure, and causing a regulating movement by an effect due to changes in the said second fluid pressure.

5. A fluid pressure regulator comprising a servo motor responsive to a first fluid pressure, means adapted to control the said first fluid pressure and responsive to a second fluid pressure, means adapted to control the said second fluid pressure and responsive to that which is to be regulated, and means whereby the changes in the said second fluid pressure are increased by the changes in the said first fluid pressure.

6. A fluid pressure regulator comprising a servo motor responsive to the pressure in a first pressure fluid chamber, means to supply pressure fluid to the said first pressure fluid chamber, means to relieve pressure fluid from the said first pressure fluid chamber, means adapted to control the pressure in the said first pressure fluid chamber in accordance with the pressure in a second pressure fluid chamber, means whereby a pressure fluid interconnection is established at all times between the said two pressure fluid chambers, means to supply pressure fluid to the said second pressure fluid chamber, means to relieve pressure fluid from the said second pressure fluid chamber, and means adapted to control the pressure in the said second pressure fluid chamber in accordance with that which is to be regulated.

7. A fluid pressure regulator comprising a servo motor responsive to the pressure in a first pressure fluid chamber, means to supply pressure fluid to the said first pressure fluid chamber, means to relieve pressure fluid from the said first pressure fluid chamber, a second pressure fluid chamber, means adapted to control the pressure in the said first pressure fluid chamber in accordance with the pressure in the said second pressure fluid chamber, means whereby pressure fluid is supplied from the said first to the said second pressure fluid chamber, means to relieve pressure fluid from the said second pressure fluid chamber, and means adapted to control the pressure in the said second pressure fluid chamber due to that which is to be regulated.

8. A fluid pressure regulator comprising a servo motor responsive to the pressure in a first pressure fluid chamber, means adapted to provide for a restricted supply of pressure fluid to the said first pressure fluid chamber, means adapted to relieve pressure fluid from the said first pressure fluid chamber and responsive to the pressure in a second pressure fluid chamber, means whereby pressure fluid is supplied from the said first to the said second pressure fluid chamber, means to relieve pressure fluid from the said second pressure fluid chamber, and means whereby the said supply and the said relief of pressure fluid to and from the said second pressure fluid chamber are made responsive to that which is to be regulated.

9. A fluid pressure regulator comprising a servo motor responsive to the pressure in a first pressure fluid chamber, means adapted to provide for a restricted supply of pressure fluid to the said first pressure fluid chamber, a differential piston, means to connect the intermediate chamber of the said differential piston with the said first pressure fluid chamber, a second pressure fluid chamber at the said differential piston, means providing for a restricted supply of pressure fluid from the said first to the said second pressure fluid chamber, means responsive to that which is to be regulated and acting to control the relief of pressure fluid from the said second pressure fluid chamber, and means actuated by the said differential piston to control the relief of pressure fluid from the said first pressure fluid chamber.

10. A self contained pressure reducing valve comprising a single seated valve, a valve disc connected to a servo motor piston, a pressure fluid supply conduit connected to the said single seated valve, a first pressure fluid chamber formed by the said servo motor piston and a servo motor cylinder, a passage to admit a restricted supply of pressure fluid from the said supply conduit to the said first pressure fluid chamber, a differential piston, a conduit connecting the said first pressure fluid chamber with the intermediate chamber of the said differential piston, a second pressure fluid chamber at the said differential piston, a passage to admit a restricted supply of pressure fluid from the said intermediate chamber to the said second chamber at the said differential piston, means to relieve pressure fluid from the said second pressure fluid chamber, means responsive to the reduced pressure and acting to increase the amount of pressure fluid relieved from the said second pressure fluid chamber upon a decrease in the reduced pressure, means adapted to relieve pressure fluid from the said first pressure fluid chamber, and means actuated by the said differential piston to increase the amount of pressure fluid relieved from the said first pressure fluid chamber upon a decrease of the pressure in the said second pressure fluid chamber.

11. A self contained steam pressure regulator comprising a horizontal pressure diaphragm, a pressure chamber above the said diaphragm adapted to be partly filled with condensate of steam separating the said diaphragm from contact with the steam, a conduit connecting the said pressure chamber with the regulated steam pressure, a second pressure chamber, an orifice between the said first and the said second pressure chamber, a throttling member actuated directly by the said pressure diaphragm and adapted to control the flow of steam through the said orifice, and means permitting the adjustment of the position of the said orifice relative to the said pressure diaphragm in the direction of the movement of the said throttling member.

12. A fluid pressure regulator comprising a piston movable in a cylinder, a plurality of circumferential rilles on said piston, longitudinal passages connecting said rilles to form a tortuous passage connecting opposite sides of the piston, and means for conducting a fluid under pressure to one side of said piston, said longitudinal passages being symmetrically offset with respect to one another to balance the lateral forces exerted by said pressure fluid on said piston.

13. In a fluid pressure regulator, a servo motor comprising a cylinder and a piston, said piston being actuated by the pressure fluid which is to be regulated, a passage to allow a restricted amount of pressure fluid to pass from one side of the piston to the opposite side, and a strainer arranged in said servo motor cylinder ahead of the said passage and adapted to filter the entire amount of pressure fluid which passes to and from the said servo motor and the said passage.

14. A fluid pressure regulator comprising a regulating mechanism, a passage including a servo motor cylinder for connecting the regulating mechanism with a source of pressure fluid, a piston in said cylinder actuated by the pressure fluid, said piston having a passage permitting a restricted amount of pressure fluid to pass from said source to said regulating mechanism and a strainer fixed in said first named passage ahead of said piston.

15. A self contained fluid pressure regulator comprising a single seated valve, a servo motor responsive to a first fluid pressure and adapted to actuate said valve, a pressure fluid supply pipe connected to said valve, a pressure fluid discharge pipe connected to said valve, regulating means responsive to the pressure which is to be regulated and acting to control said first fluid pressure, conduits connecting said regulating means with said servo motor and said discharge pipe, and manually operable means for closing said conduits.

16. A self contained fluid pressure regulator comprising a single seated valve, a servo motor responsive to a first fluid pressure and adapted to actuate the said valve, a pressure fluid supply pipe and a pressure fluid discharge pipe connected to the said valve, regulating means responsive to the pressure which is to be regulated and acting to control the said first fluid pressure, conduits connecting the said regulating means with the said servo motor and the said discharge pipe, manually operable means for closing said conduits and simultaneously connecting said regulating means with the atmosphere, and manually operable means for actuating said valve.

17. A fluid pressure regulator comprising a piston movable in a cylinder, a plurality of circumferential rilles on said piston, longitudinal passages connecting said rilles to form a tortuous passage connecting opposite sides of the piston, and means for conducting a fluid under pressure to one side of said piston, said longitudinal passages being oppositely located to balance the lateral forces exerted by said pressure fluid on said piston.

In testimony whereof I affix my signature.
FRITZ A. WETTSTEIN.